United States Patent [19]

Takeyasu

[11] Patent Number: 5,361,170
[45] Date of Patent: Nov. 1, 1994

[54] POLYGONAL MIRROR

[75] Inventor: Hatsuichi Takeyasu, Tokyo, Japan

[73] Assignee: Asahi Kogaku Kogyo Kabushiki Kaisha, Tokyo, Japan

[21] Appl. No.: 74,459

[22] Filed: Jun. 10, 1993

[30] Foreign Application Priority Data

Jun. 11, 1992 [JP] Japan ................................ 4-046669
Dec. 18, 1992 [JP] Japan ................................ 4-091989
Dec. 18, 1992 [JP] Japan ................................ 4-091990

[51] Int. Cl.$^5$ ..................... B29L 11/00; G02B 26/10
[52] U.S. Cl. .................................... 359/850; 359/857; 359/872; 359/874; 359/876; 359/217; 359/848; 359/900
[58] Field of Search ............... 359/850, 857, 872, 874, 359/876; 350/6.8, 60.9, 320

[56] References Cited

U.S. PATENT DOCUMENTS

| | | | |
|---|---|---|---|
| 3,836,243 | 9/1974 | Melchior | 353/122 |
| 3,872,318 | 3/1975 | Murayama | 307/88 ET |
| 4,198,630 | 4/1980 | Serinken et al. | 340/784 |
| 4,807,187 | 2/1989 | Tabushi | 365/108 |
| 4,884,856 | 12/1989 | Takeyasu et al. | |
| 5,024,496 | 6/1991 | Oikawa | |

FOREIGN PATENT DOCUMENTS

| | | |
|---|---|---|
| 0127140 | 5/1984 | European Pat. Off. |
| 0291659 | 11/1988 | European Pat. Off. |
| 2457912 | 7/1976 | Germany |
| 3707281A1 | 9/1987 | Germany |
| 58-139101 | 8/1983 | Japan |
| 59-173021 | 11/1984 | Japan |
| 61-56624 | 4/1986 | Japan |
| 4313718 | 11/1992 | Japan |
| 58152221 | 9/1993 | Japan |
| 1189059 | 4/1970 | United Kingdom |

OTHER PUBLICATIONS

Scientific American, vol. 263, No. 5 Nov., 1990 pp. 88–89.
Digest of Papers; Compcon Spring 84–San Francisco, pp. 110–114 Carter "Prospects for Computation at the Molecular Size Level".
Optical Computing & Processing, vol. 1, No. 1, Jan. 1991 pp. 13–21.
United Kingdom Search Report.

Primary Examiner—Viet Q. Nguyen
Attorney, Agent, or Firm—Sandler Greenblum & Bernstein

[57] ABSTRACT

A polygonal mirror according to the present invention is provided with a mirror body, a plurality of reflection faces formed to side surfaces of the mirror body, and reinforcing ribs integrally formed to both the upper and lower surfaces of the mirror body, respectively. Each of the reinforcing ribs has an outer circumference that is larger than the outer circumference of the mirror body.

13 Claims, 5 Drawing Sheets

POLYGONAL MIRROR

BACKGROUND OF THE INVENTION

The present invention relates to a polygonal mirror used to deflect an incident light ray; the deflected ray is employed to perform a scanning function in a printing device, such as a laser beam printer.

Printing devices such as laser beam printers, photo-plotters etc. have become essential tools for the printing of documents and photographs. These laser beam print devices utilize an electrophotographic system wherein a laser beam is used to scan the photosensitive layer on the surface of a photosensitive drum along the axis thereof (main scanning), and at the same time the photosensitive drum is rotated (auxiliary scanning) to thereby form a latent image corresponding to an image (generated by a computer or optical scanner), onto the photosensitive layer on the surface of the photosensitive drum.

Toner is first deposited to the latent image by a development unit to form a toner image (development), and the toner image is transferred onto a recording paper by a transfer unit. Then, the toner image is fixed onto the recording paper by a fixing unit. The laser photo-plotter scans the surface of a photosensitive material by a laser beam to create an original for a print board and the like. In the laser beam printer, laser photo-plotter etc., a rotary multi-faced mirror or a so-called polygonal mirror is employed such that the laser beam, from a fixedly mounted laser diode, scans linearly. The polygonal mirror uses a plurality of the side surfaces of a regular prism with a regular polygon in a plane figure as deflection mirrors.

Conventionally, the polygonal mirror is formed from a raw material such as optical glass or aluminum alloy. The raw material is processed and formed to a predetermined polygonal shape and the side surfaces (surfaces to be subjected to a mirror finish) thereof are polished to a predetermined accuracy (surface roughness/degree of flatness) and then the sides are coated with silver or aluminum to form mirror surfaces.

In recent years, aluminum alloy, that is easy to process, has been increasingly employed as the raw material for the polygonal mirror. However, although the aluminum alloy is easy to process, it is extremely difficult to process the individual surfaces of the polygonal prism to bring the accuracy to a requisite level. Thus, a long time is required for processing, thereby increasing the manufacturing cost. To cope with this problem, plastic material has been considered as a new raw material for the polygonal mirror. A metal mold could then be used to integrally form the polygonal mirror by means of injection molding.

When the polygonal mirror is molded by using the plastic material as described above, however, the reflection faces thereof must be finished to glossy surfaces with a surface roughness of 0.1 $\mu$m or less in order to effectively reflect the light ray. Further, the reflection faces must have a plane surface accuracy of at least one half the wavelength of the light ray so that they can accurately reflect the light ray.

Although various conventionally molding techniques have been proposed to satisfy these conditions, they cannot greatly change the physical property of the plastic material itself. In particular, the molding shrinkage percentage is difficult to change. Thus it is difficult to maintain a surface deformation caused by molding shrinkage within a required accuracy. For example, there has been conventionally employed a method of mixing the plastic material with other material such as carbon fiber, glass fiber etc. to reinforce the plastic material and stabilize its molding dimension. With the conventional method of mixing the fiber, however, a surface gloss and flatness, necessary to utilize the surfaces of the molded plastic material as reflection mirrors, cannot be presently obtained.

Further, when the polygonal mirror is integrally molded by injection molding using the plastic material as described above, the plastic material, being melted, is supplied into the cavity of a metal mold through a runner gate at a predetermined pressure. As a general method, the runner gate is located at a mounting hole portion defined through the central portion of the polygonal mirror in the thickness direction thereof. In this case, since the plastic material, that has cooled and solidified in the runner gate, is not required, it must be cut off in a subsequent process. If even a slight amount of the unrequired part remains after the cutting-off process, a problem arises in that the inside diameter of the mounting hole and the distance from the center of rotation to the respective reflection faces, cannot be kept to predetermined values.

To cope with this problem, a method of cutting off the runner gate in the metal mold, a method of constituting the gate from a pin gate, and the like have been considered, but these methods make the arrangement of the metal mold complex and the molding process difficult, and thus an improved method is desired.

A further problem arises however when the polygonal mirror is integrally formed by means of injection molding by using plastic material, as described above. Because of the polygonal shape, sink marks develop in the portion where the mirror reflection surfaces are formed due to the non-uniformity of the wall thickness and also because the molding shrinkage percentage varies depending upon differences in molding conditions (pressure, temperature, time and operating speed), so that the molding shrinkage percentage sometimes exceeds an allowable accuracy range. Therefore, this makes the plastic material difficult to use and, if employed, will produce a low yield.

Further, when the polygonal mirror is rotated at high speed, there is a possibility that the mirror reflection faces are deformed by the centrifugal force produced by the rotation. Thus, the reflected laser beam may be scanned in an erroneous direction. Furthermore, since all the side surfaces of the polygonal mirror are composed of reflection faces, it is difficult to handle the mirror during the manufacturing process.

SUMMARY OF THE INVENTION

It is therefore an object of the present invention to provide an improved polygonal mirror capable of simultaneously obtaining the surface gloss and flatness of each reflection face when the polygonal mirror is molded.

Further, another object of this invention is to provide an improved polygonal mirror which does not damage the dimensional accuracy of the inside diameter of a mounting hole and the accuracy of the distance from the center of rotation to the respective reflection faces.

Yet another object of this invention is to provide a polygonal mirror by which the efficiency of a job for removing plastic material solidified in a runner can be improved.

This invention further provides an improved polygonal mirror by which the deformation of the mirror reflection faces can be effectively restricted even while the polygonal mirror is in rotation.

Further, another object of this invention is to provide a polygonal mirror capable of improving the manufacturing efficiency when it is processed.

Yet, another object of this invention is to provide a polygonal mirror capable of being manufactured with an improved yield.

In order to achieve the above-mentioned object, according to a first aspect of the present invention, there is provided a polygonal mirror which includes a mirror body, of which at least one reflection face is formed to a side surface of the mirror body, and reinforcing ribs are integrally formed to both the upper and lower surfaces of the mirror body, respectively, each having an outer circumference that is larger than the outer circumference of the mirror body.

According to a second aspect of the present invention, there is provided a polygonal mirror which is made by injection molding, and which includes a mirror body, of which at least one reflection face is formed to a side surface of the mirror body, and a through hole is defined as passing through the mirror body in the axial direction thereof, and through which a drive shaft is to be passed. The through hole includes a mounting hole portion which has an inner circumference in driving contact with the outer circumference of the drive shaft when the drive shaft is inserted and is concentric with the central axial line of the mirror body, and an inserting hole portion into which the drive shaft is to be loosely inserted. Connecting portions of gates used in the injection molding are formed on the inner circumference of the inserting hole portion.

According to a third aspect of the present invention, there is provided a polygonal mirror which includes a mirror body molded from a plastic material in which a spherical material having a predetermined particle size or less is dispersed and kneaded. At least one reflection face is formed on a side surface of the mirror body, wherein when the mirror is rotated, an incident light ray is deflected by the reflection face to perform a scanning function.

DESCRIPTION OF THE PREFERRED EMBODIMENT

The arrangement of an embodiment of a polygonal mirror according to the present invention will be described below with reference to drawings.

FIG. 1 to FIG. 4 show a polygonal mirror 10 having six reflection faces for use in a laser beam printer. In this embodiment, the polygonal mirror 10 is made of polycarbonate (PC) as a plastic material integrally molded by using a metal mold and injection molding. In general, the polygonal mirror 10 is composed of a mirror body 12 and reinforcing ribs 14, 16 integrally formed on both the upper and lower surfaces of the mirror body 12.

In this embodiment, the feature of this invention is that metallic silicon powder, as a precise spherical material having an average particle size of 0.5 μm, is dispersed in and kneaded with polycarbonate as the plastic material in an amount preferably about 40% by weight to constitute the material used in injection molding. Note, in this embodiment, silica ($SiO_2$) is employed as a specific material for the metallic silicon powder.

The mirror body 12 in this embodiment is formed with a shape of a thin regular hexagonal prism. The regular hexagon has parallel sides separated by a distance of 26 mm with each side having a thickness (i.e., a distance in the axial direction) of 3 mm. Each of the six surfaces, constituting the hexagonal prism, is set to have a predetermined surface accuracy and are formed as reflection faces 18a through 18f. More specifically, the circumference of this polygonal mirror 10 is surrounded by six mirror reflection faces 18a through 18f with the adjacent faces forming an angle of 120°. In this embodiment, the respective mirror reflection faces 18a through 18f are made parallel to the rotational axis line of the polygonal mirror 10.

Figure 1:
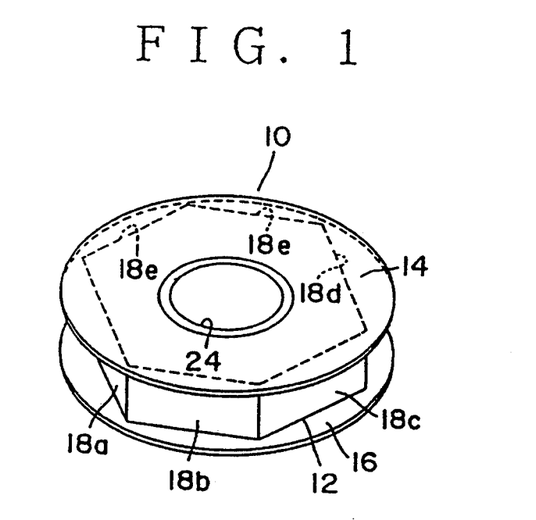
FIG. 1 is a perspective view showing the arrangement of an embodiment of a polygonal mirror according to this invention.
Figure 2:
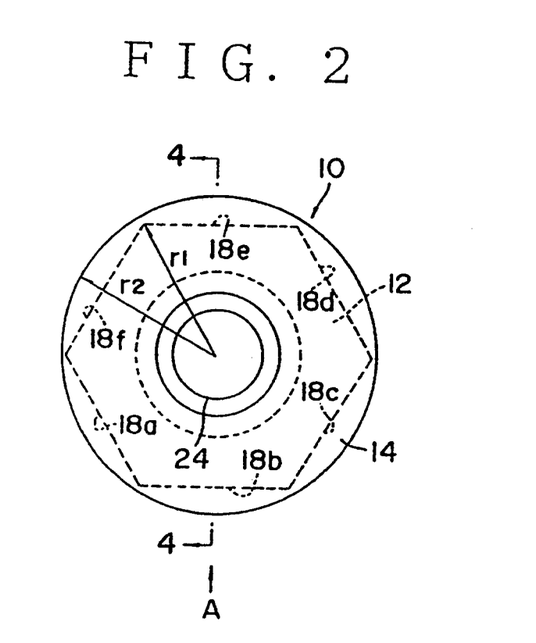
FIG. 2 is a top view showing the configuration of the upper surface of the polygonal mirror shown in FIG. 1.
Figure 3:
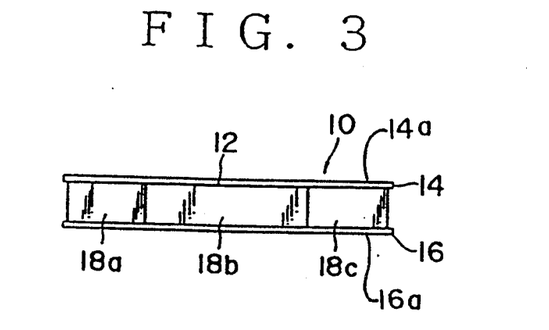
FIG. 3 is a front elevational view of the polygonal mirror, as shown in FIG. 2, viewed from the direction shown by the arrow A of FIG. 2.

On the other hand, as shown in FIG. 2, the respective reinforcing ribs 14, 16 are formed as thin disks having a radius r2 set larger than the radius r1 of the circumscribed circle of the regular hexagon prescribing the plane figure of the mirror body 12. In this embodiment, the reinforcing ribs 14, 16 have a diameter of 31 mm and a thickness of 1 mm, respectively. Then, the reinforcing ribs 14, 16 are formed at the respective end faces (i.e., on the upper and lower end surfaces when a rotational axis line is formed along the vertical direction) along the axial direction of the mirror body 12 and continuously thereto.

Further, the outer end surfaces (14a or 16a), of one of the reinforcing ribs (14 or 16), are arranged to have a predetermined accuracy (flatness, a distance to the mirror body 12 and at right angles with respect to the mirror reflection faces 18a through 18f) and serve as a reference face when the polygonal mirror 10 is installed.

Figure 6:
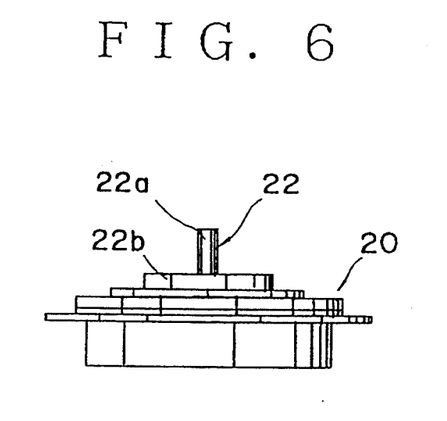
FIG. 6 is front elevational view of a drive motor with a drive shaft to which the polygonal mirror of the embodiment is mounted.

Further, a through hole 24, having a diameter of 15 mm, is defined in the polygonal mirror 10 along its axial direction (and therefore also defined in the thickness direction) to enable the polygonal mirror 10 to be mounted to the drive shaft 22 of the drive motor 20, as shown in FIG. 6, of an apparatus (i.e., a laser beam printer) with which it is used. That is, the through hole 24 passes through the end surfaces of the respective reinforcing ribs 14. Note, the center of the through hole 24 (i.e., the center of rotation of the polygonal mirror 10) is arranged to be at an equal distance from each of the mirror reflection faces 18a through 18f of the mirror body 12 within a predetermined accuracy (so that the polygonal mirror does not perform eccentric movement). Further, the diameter of the through hole is formed such that it has a predetermined accuracy.

In this embodiment, the aforesaid drive shaft 22, as shown in FIG. 6, is composed of a shaft body 22a and a disc-shaped mounting portion 22b integrally and coaxially attached to the outer circumference of the base portion on the drive motor 20 side of the shaft body 22a. More specifically, the drive shaft 22 is arranged such that the shaft body 22a and mounting portion 22b are integrally rotated. In addition, the outer circumference of the mounting portion 22b is formed larger than the outer circumference of the shaft body 22a (in other words, the outer circumference of the mounting portion 22b is located outward, in the radial direction, of the outer circumference of the shaft body 22a).

Figure 4:
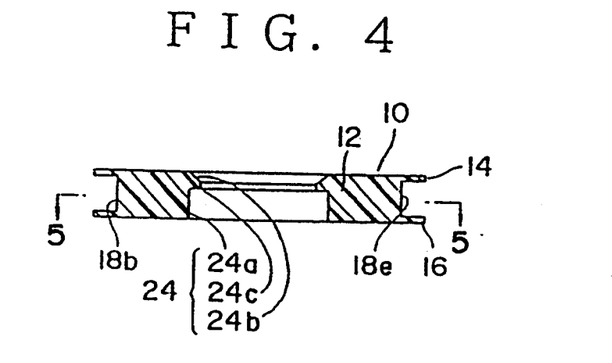
FIG. 4 is a cross-sectional view of the polygonal mirror taken along the line 4—4 shown in FIG. 2.

On the other hand, as shown in the cross-sectional view of FIG. 4, the through hole 24, defined in the mirror body 12, is composed of a mounting hole portion 24a, a tapered hole portion 24b and an inserting hole portion 24c. The mounting hole portion 24a is opened at the reinforcing rib 16 which is integrally formed to the end surface of the mirror body 12 on the side where the drive motor 20 is disposed, and engaged with the outer circumference of the aforesaid mounting portion 22b in close driving contact therewith. The tapered hole portion 24b is opened at the reinforcing rib 14 which is integrally formed to the end surface of the mirror body 12 on the side opposite to that where the drive motor 20 is disposed, and has a taper-shaped inner circumference. The inserting hole portion 24c is located between the mounting hole portion 24a and the tapered hole portion 24b with the aforesaid shaft body 22a loosely inserted thereinto.

Figure 7:
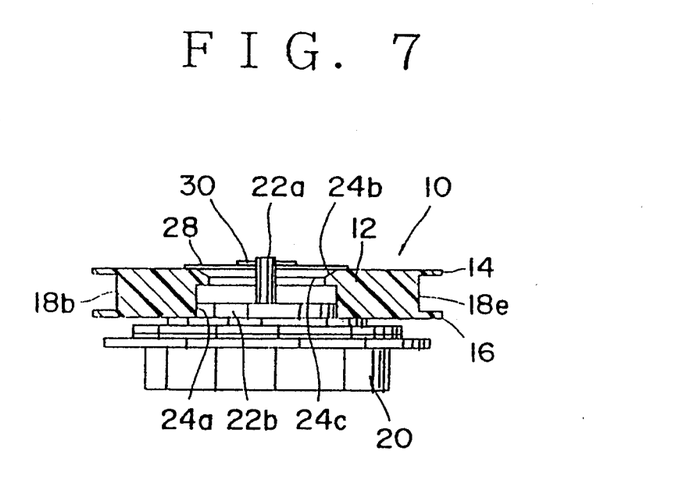
FIG. 7 is a front elevational view of the polygonal mirror of the embodiment mounted to the drive shaft of the drive motor.

Note, In this embodiment, the mounting hole portion 24a has an inside diameter that is larger than that of the inserting hole portion 24c (in other words, the inner circumference of the mounting hole portion 24a is located outward, in the radial direction, of the inner circumference of the inserting hole portion 24c). More specifically, in this embodiment, as shown in FIG. 7, the inner circumference of the inserting hole portion 24c is radially spaced apart from the outer circumference of the shaft body 22a of the drive shaft 22 in the state that the thus arranged polygonal mirror 10 is mounted to the drive shaft 22 of the drive motor 20. Note, in the figure, reference numeral 28 designates a washer (press plate) for pressing the upper surface of the polygonal mirror 10. Reference numeral 30 designates a clip (C-shaped ring) for locking the washer 28 to the drive shaft 22, in other words, for locking the polygonal mirror 10 to the drive shaft 22.

Figure 8:
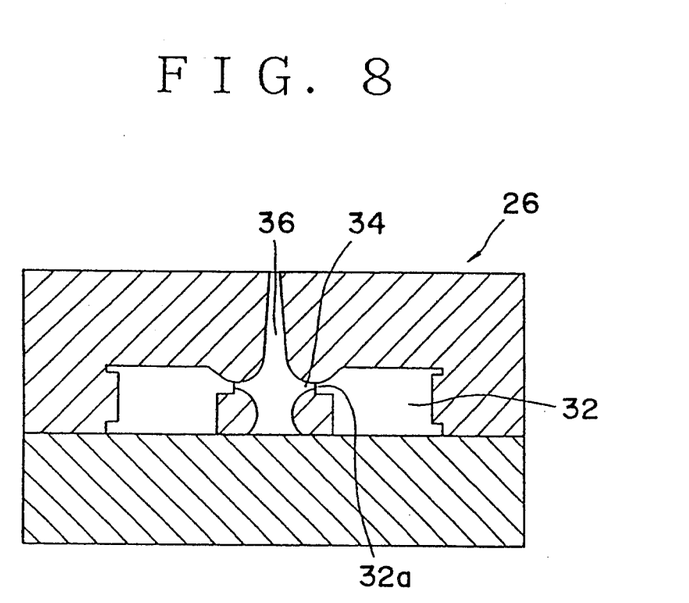
FIG. 8 is a longitudinal cross sectional view schematically showing the internal arrangement of a metal mold for injection molding the polygonal mirror of the embodiment.

One of the features of this invention is described in FIG. 8. When injection molding is carried out, gates 34, for supplying a melted plastic material into a cavity 32, are connected to the end surfaces 32a (corresponding to the inner circumference of the inserting hole portion 24c) of the cavity 32 of a metal mold 26 (corresponding to the mirror body 12), in the state that the gates 34 are opened to the end surfaces 32a. Note, a runner 36 is connected to the gates 34 and the melted plastic material is supplied to the runner 36 through a sprue (not shown) under a predetermined pressure.

As described above, in this embodiment, as shown in FIG. 9, when the injection molding is completed, the plastic material solidified in the runner 36 (i.e., an unrequired part 38) is connected to the inner circumference of the inserting hole portion 24c which is set to be spaced apart from the outer circumference of the shaft body 22a of the drive shaft 22 in the state that the polygonal mirror 10 is mounted to the drive motor 20 after the mold is opened.

Figure 9:
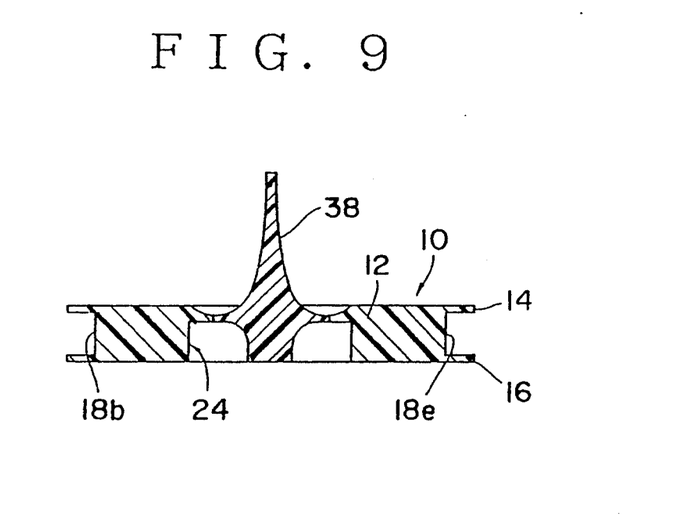
FIG. 9 is a front elevational view showing a non-required part 38 connected to the polygonal mirror after the mold is opened and injection molding has been completed.

Therefore, when the unrequired part 38 is removed by a normal removing operation, for example, by being cut by a cutter (not shown) or by any other method, even if the unrequired part is not completely removed from the inner circumference of the inserting hole portion 34c, the remaining section of the unrequited part 38 does not adversely affect the positioning accuracy of the polygonal mirror 10 on the drive shaft 22 (i.e., the accuracy of the diameter of the through hole 24 through which the drive shaft 22 is passed and the accuracy of the distance from the center of rotation of the drive shaft 22 to the respective reflection faces 18a through 18f). Thus, when the polygonal mirror 10 is mounted on the drive shaft 22 of the drive motor 20, the positioning accuracy of the polygonal mirror 10, to the drive shaft 22, is prescribed by the engagement of the mounting hole portion 24a of the through hole 24 with the mounting portion 22b of the drive shaft 22.

Further, a conventional removing operation of the unrequired part 38 must be carried out so that it is completely removed. Thus, the efficiency of the operation is low. However, in this embodiment, the unrequited part 38 does not have to be completely removed, only substantially removed. Therefore the efficiency of the operation for removing the unrequired part 38, solidified in the runner 34, can be improved.

As described above, the polygonal mirror 10 has the aforesaid configuration. Since the gates 34 are connected to the inserting hole portion 24c of the through hole 24 when the polygonal mirror 10 is injection-molded, an equal distance can be maintained from the gates 34 to the outer circumferences of the reinforcing ribs 14, 16 (i.e., to the maximum outside diameter portion of the polygonal mirror 10) as well as a substantially uniform wall thickness can be achieved as compared with the case in which the mirror body 12 is independently molded. Further, the occurrence of sink marks are prevented in the mirror reflection faces 18a through 18f and other portions, and thus, the molding can be greatly improved. As a result, the yield of the molded polygonal mirror 10 is greatly improved to thereby improve its productivity. In other words, the polygonal mirror 10 is molded of a plastic material such as polycarbonate or the like and the productivity thereof is improved so that the polygonal mirror 10 can be molded at a low cost.

Particularly, in this embodiment, as described above, polycarbonate as the plastic material, in which spherical silica material (powder) as the precise spherical material, having an average particle diameter of 0.5 μm, is dispersed and kneaded in an amount of 40% by weight, is injection molded. As a result, the molding shrinkage percentage of the mirror body 12 of the molded polygonal mirror 10 can be effectively restricted. Thus, the surface gloss and flatness of each of the reflection faces 18a through 18f formed on the side surfaces of the mirror body 12 are stably achieved so that the reflection faces 18a through 18f can be used as reflection mirrors.

Further, after the polygonal mirror 10 has been injection-molded as described above, silver or aluminum is plated onto the mirror reflection faces 18a through 18f of the mirror body 12 to thereby complete the construction of the polygonal mirror 10.

As described above, the polygonal mirror 10, arranged as above, is mounted to a laser beam printer (not shown) and driven in rotation for use. Recently, there is a tendency to increase the rotational speed of the polygonal mirror 10 to reduce the scanning time etc. When the rotational speed of the polygonal mirror 10 is increased as described above, a large centrifugal force caused by the rotation is applied accordingly. Although a centrifugal force applied to the respective mirror reflection faces 18a through 18f has a given value for a predetermined rotational speed, the amount of deformation of the mirror reflection faces 18a through 18f, deformed by the action of the centrifugal force, is different depending upon the distance of the mirror reflection faces 18a through 18f from the center of rotation of the mirror (specifically, in proportion to the distance).

Figure 5:
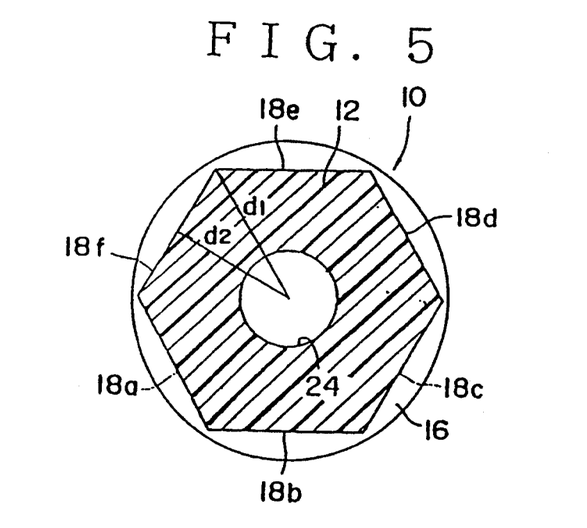
FIG. 5 is a cross-sectional view of the polygonal mirror taken along the line 5—5 of FIG. 4 to explain the action of a centrifugal force applied to the respective mirror reflection faces in the embodiment.

More specifically, this problem will be described with respect to the mirror reflection face 18f as a typical case. As shown in FIG. 5, the distance of the mirror reflection face 18f, from the center of rotation, is a maximum of d1 at the ends, (i.e., this distance is the same as the radius r1 of the aforesaid circumscribed circle) and a minimum of d2 at the central portion. As a result, as the polygonal mirror 10 is rotated at a high speed, the respective mirror reflection faces 18a through 18f tend to be deformed in such a manner that the opposite end portions are further out (radially) than the central portions thereof. In other words, as the polygonal mirror 10 is rotated at the high speed, the flatness of the mirror reflection faces 18a through 18f tends to deteriorate.

In this embodiment, however, since the upper and lower end portions of the respective mirror reflection faces 18a through 18f are reinforced by the upper and lower reinforcing ribs 14, 16, a resistance force, against the deformation caused by the centrifugal force as mentioned above, is increased, and thus, it is difficult to deform the faces. As described above, in this embodiment, even if the polygonal mirror 10 is rotated at high speed, the deformation of the respective mirror reflection faces 18a through 18f, due to the centrifugal force, can be effectively restricted by the use of both reinforcing ribs 14, 16. Further, the flatness of the respective mirror reflection faces 18a through 18f is maintained in a good state by injection molding the plastic material with the spherical silica material (powder) as the precise spherical material, which has an average particle diameter of 0.5 μm and is dispersed and kneaded in an amount of 40% by weight. As a result, even if the image formation speed is increased in a laser beam printer using the polygonal mirror 10, no blur is caused in the scanning direction by the rotation of the polygonal mirror 10. Thus a high quality image can be obtained.

This invention is not limited to the embodiment described above, but various modifications may be anticipated by the invention.

For example, although the mirror reflection faces 18a through 18f are described as forming a hexagon, this invention is not limited to this arrangement. Thus, for example, the faces of the mirror body 12 may form a triangle to provide three mirror reflection faces, a square to provide four mirror reflection faces, a regular pentagon to provide five mirror reflection faces, a regular heptagon to provide seven mirror reflection faces, or a regular octagon to provide eight mirror reflection faces. That is, any number of the mirror reflection faces may be formed. Further, the plane figure of the mirror body 12 may be formed to any arbitrary polygon instead of being set to a regular polygon. Further the mirror reflection faces may be set to two faces without being arranged as a polygon, or the mirror reflection face may be composed of only one face. Therefore, any arrangement may be applicable so long as it has at least one mirror reflection face.

Further, in the above embodiment, although the respective mirror reflection faces 18a through 18f are described to be parallel to the rotational axis line of the polygonal mirror 10, this invention is not limited to that arrangement. For example, the faces may be inclined with respect to the rotational axis line at a predetermined angle. In other words, the mirror body 12 may be formed to a pyramidal frustum.

Further, in the aforesaid embodiment, although the material of the polygonal mirror 10 is described to be composed of a plastic material, such as polycarbonate or the like, this invention is not limited to this material but may be suitably changed depending upon strength and molding property.

Further, in the aforesaid embodiment, although the respective reinforcing ribs 14, 16 are described to be formed to a disc shape, this invention is not limited to this arrangement, but any arrangement may be employed so long as the outer circumference of the respective reinforcing ribs 14, 16 are projected further than the outer circumference of the mirror body 12.

Further, in the aforesaid embodiment, although the polygonal mirror 10 is described to be integrally molded by using injection molding, this invention is not limited to injection molding, but may be integrally molded by compression molding.

Further, in the aforesaid embodiment, although the use of the silica spheres (powder) as the precise spheres is described, this invention may employ, for example, glass spheres in place of the silica spheres.

Further, in the aforesaid embodiment, although a mixing ratio of the silica spheres (powder) as the precise spheres is described to be preferably about 40% by weight, this invention is not limited to this arrangement, but may be arbitrarily changed in the range in which the surface gloss and flatness of the respective reflection faces 18a through 18f are not damaged.

Further, in the aforesaid embodiment, although the silica spheres (powder) as the precise spheres is described to have an average particle size of 0.5 μm, this invention is not limited to this arrangement, but the precise spheres may have any average particle size less than 0.5 μm.

Figure 10:
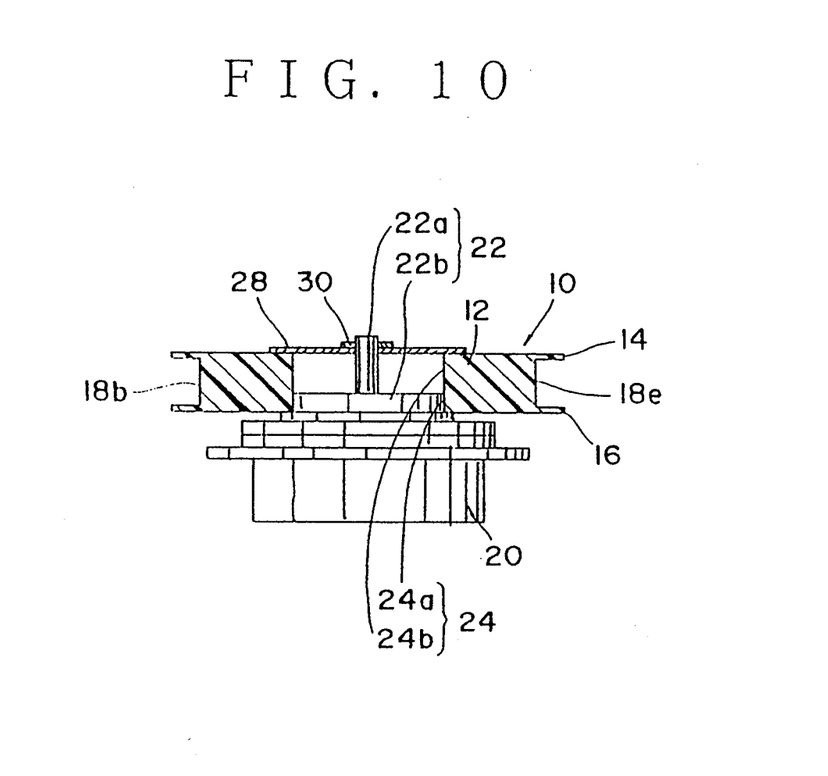
FIG. 10 is a cross-sectional view showing the arrangement of a first modification of the polygonal mirror according to the present invention.

Further, in the aforesaid embodiment, although the inner circumference of the mounting hole portion 24a is described to be set larger than the inner circumference of the inserting hole portion 24c, as shown in FIG. 4, this invention is not limited thereto, but, for example, as shown in a first modification of FIG. 10, the same effect as that of the aforesaid embodiment can be obtained even if the inner circumference of the mounting hole portion 24a is set equal to that of the inserting hole portion 24c, and the former is made flush with the latter.

Figure 11:
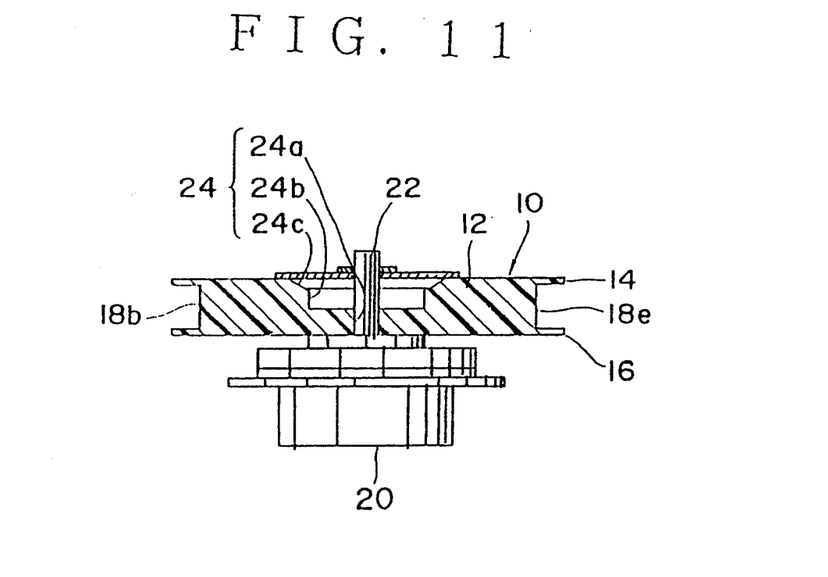
FIG. 11 is a cross-sectional view showing the arrangement of a second modification of the polygonal mirror according to the present invention.

Further, as shown in a second modification of FIG. 11, the same effect as that of the aforesaid embodiment can be obtained even if the drive shaft 22 is composed of a single shaft having a uniform cross section and the inner diameter of the inserting hole portion 24c is formed larger than that of the mounting hole portion 24a.

Thus, the same effect as that of the aforesaid embodiment can be obtained by such an arrangement that the through hole 24 includes the mounting hole portion 24a which has an inner circumference in driving contact with the outer circumference of the mounting portion 22b of the drive shaft 22, and is concentric with the central axial line of said mirror body 12 and the inserting hole portion 24c into which the shaft body 22a of the drive shaft 22 is inserted. The connecting holes of the gates, used in injection molding, are formed to the inner circumference of the inserting hole portion 24c.

The present disclosure relates to subject matters contained in Japanese Utility Model Applications Nos. HEI 4-46669 filed on Jun. 11, 1992, HEI 4-91989 filed on Dec. 18, 1992, and HEI 4-91990 filed on Dec. 18, 1992, which are expressly incorporated herein by reference in their entirety.

What is claimed is:

1. A combination of a polygonal mirror and a drive motor for driving the polygonal mirror,
   said polygonal mirror comprising:
   a mirror body; and
   at least one reflection face formed on a side surface of said mirror body, and
   said drive motor comprising:
   a motor body; and
   a drive shaft extending from said motor body and being rotated by said motor body,
   wherein
   said mirror body includes a through hole which is formed to pass through said mirror body in an axial direction of said mirror body, said drive shaft being inserted through said through hole,
   said through hole comprising:
   a mounting hole portion having an inner periphery in driving contact with an outer periphery of said drive shaft and located concentrically with a central axis of said mirror body, and
   an inserting hole portion into which said drive shaft is loosely inserted, and
   said drive shaft includes:
   a shaft body; and
   a mounting portion provided around an outer periphery of said shaft body for rotation together with said shaft body,
   the inner periphery of said mounting hole portion being in driving contact with an outer periphery of said mounting portion of said drive shaft and the inner periphery of said inserting hole portion being spaced from an outer periphery of said shaft body, and
   a pressing plate coupled to an end portion of said shaft body extending from said polygonal mirror for pressing an end surface of said mirror body.

2. The combination according to claim 1, wherein the inner periphery of said mounting hole portion is flush with the inner periphery of said inserting hole portion.

3. The combination according to claim 1, wherein said mounting hole portion has a diameter that is larger than a diameter of said inserting hole portion.

4. The combination according to claim 1, wherein the outer periphery of said mounting portion is flush with the outer periphery of said shaft body.

5. The combination mirror according to claim 4, wherein said inserting hole portion has a diameter that is larger than that of said mounting hole portion.

6. The combination mirror according to claim 1, wherein said mirror body is molded from a plastic material in which a spherical material having a predetermined particle size or less is dispersed and kneaded.

7. The combination mirror according to claim 6, wherein said mirror body is molded by injection molding.

8. The combination mirror according to claim 6, wherein said spherical material is composed of glass spheres having a particle size of 0.5 μm or less.

9. The combination mirror according to claim 6, wherein said spherical material is composed of metallic silicon powder having a particle size of 0.5 μm or less.

10. The combination mirror according to claim 9, wherein said metallic silicon powder contains silica.

11. The combination mirror according to claim 6, which further comprises:
   a reflection layer which is deposited to said at least one reflection face.

12. The combination mirror according to claim 11, wherein said reflection layer is formed by a plating process.

13. The combination according to claim 1, wherein said mounting portion of said drive shaft has a diameter larger than a diameter of said shaft body.

* * * * *

UNITED STATES PATENT AND TRADEMARK OFFICE
CERTIFICATE OF CORRECTION

PATENT NO. : 5,361,170
DATED : November 1, 1994
INVENTOR(S) : Hatsuichi TAKEYASU It is certified that error appears in the above-indentified patent and that said Letters Patent is hereby corrected as shown below:

```
At column 10, line 24 (claim 5, line 1), delete "mirror".
At column 10, line 28 (claim 6, line 1), delete "mirror".
At column 10, line 33 (claim 7, line 1), delete "mirror".
At column 10, line 36 (claim 8, line 1), delete "mirror".
At column 10, line 40 (claim 9, line 1), delete "mirror".
At column 10, line 44 (claim 10, line 1), delete "mirror".
At column 10, line 47 (claim 11, line 1), delete "mirror".
At column 10, line 51 (claim 12, line 1), delete "mirror".
```

Signed and Sealed this

Twenty-third Day of May, 1995

*Attest:*

BRUCE LEHMAN

*Attesting Officer*   Commissioner of Patents and Trademarks